United States Patent
Ross (10) Patent No.: US 9,358,650 B2
(45) Date of Patent: Jun. 7, 2016

(54) SYSTEM FOR AND METHOD OF RE-PROFILING LOCOMOTIVE AND RAIL CAR WHEELS

(75) Inventor: Harold F. Ross, Escanaba, MI (US)

(73) Assignee: HJR Equipment Rental, Inc., Bark River, MI (US)

( * ) Notice: Subject to any disclaimer, the term of this patent is extended or adjusted under 35 U.S.C. 154(b) by 963 days.

(21) Appl. No.: 13/587,740

(22) Filed: Aug. 16, 2012

(65) Prior Publication Data

US 2013/0042731 A1 Feb. 21, 2013

Related U.S. Application Data

(60) Provisional application No. 61/524,652, filed on Aug. 17, 2011.

(51) Int. Cl.
*B23B 5/32* (2006.01)
*B23Q 9/00* (2006.01)
*B23B 5/00* (2006.01)

(52) U.S. Cl.
CPC ............... *B23Q 9/0078* (2013.01); *B23B 5/32* (2013.01); *B23B 2215/36* (2013.01); *Y10T 82/10* (2015.01); *Y10T 82/185* (2015.01)

(58) Field of Classification Search
CPC .................................. B23B 5/28; E02D 3/026
See application file for complete search history.

(56) References Cited

U.S. PATENT DOCUMENTS

| | | | | |
|---|---|---|---|---|
| 1,397,468 A | * | 11/1921 | Augustus et al. | 29/27 B |
| 1,604,962 A | * | 11/1926 | Benzon, Jr. | 82/104 |
| 3,256,754 A | * | 6/1966 | Rivierre et al. | 408/241 R |
| 3,667,329 A | * | 6/1972 | Dombrowski | 82/104 |
| 4,276,793 A | * | 7/1981 | Wirtz | 82/1.11 |
| 4,802,285 A | | 2/1989 | Ligacz et al. | |
| 4,939,962 A | | 7/1990 | Wittkopp et al. | |
| 4,951,534 A | | 8/1990 | Brinkmann et al. | |
| 5,105,691 A | | 4/1992 | Brinkmann et al. | |
| 5,511,913 A | | 4/1996 | Naumann | |
| 5,678,963 A | | 10/1997 | Heimann | |
| 5,678,966 A | | 10/1997 | Heimann | |
| 5,678,973 A | | 10/1997 | Cox | |
| 5,890,554 A | | 4/1999 | Sturges | |
| 5,890,854 A | | 4/1999 | Naumann et al. | |
| 6,264,407 B1 | | 7/2001 | Tinken | |

(Continued)

FOREIGN PATENT DOCUMENTS

| | | |
|---|---|---|
| EP | 0 491 067 | 6/1992 |
| EP | 2 303 493 | 4/2011 |

(Continued)

OTHER PUBLICATIONS

Extended European Search Report for EP Application No. 12180870.3, dated Oct. 29, 2012, 8 pages.

(Continued)

*Primary Examiner* — Will Fridie, Jr.
(74) *Attorney, Agent, or Firm* — Foley & Lardner LLP (57) ABSTRACT

A system for re-profiling a first wheel in accordance with the first profile includes a lathe cutting tool and a plate. The first wheel is associated with a train or other rail riding device. The lathe cutting tool is configured to engage the first wheel and attach to a compound slide mechanism. The plate includes supports for supporting the wheel assembly including the first wheel. The plate is attached to the compound slide mechanism.

20 Claims, 6 Drawing Sheets

(56) References Cited

U.S. PATENT DOCUMENTS

| | | |
|---|---|---|
| 6,519,861 B1 | 2/2003 | Brueck et al. |
| 6,769,365 B1 | 8/2004 | Ward |
| 6,871,416 B2 | 3/2005 | Leja et al. |
| 8,186,250 B2 | 5/2012 | Ross |
| 8,408,105 B2 * | 4/2013 | Ross .............................. 82/104 |
| 8,789,448 B2 * | 7/2014 | Ross .............................. 82/104 |
| 8,806,996 B2 | 8/2014 | Cooper |
| 2010/0005935 A1 | 1/2010 | Ross |
| 2010/0154606 A1 * | 6/2010 | Thyni ............................ 82/105 |
| 2012/0067179 A1 | 3/2012 | Ross |
| 2013/0042731 A1 * | 2/2013 | Ross .............................. 82/1.11 |
| 2013/0112052 A1 | 5/2013 | Reiche |

FOREIGN PATENT DOCUMENTS

| | | |
|---|---|---|
| JP | 09-108902 A | 4/1997 |
| JP | 09-295201 A | 11/1997 |
| KR | 970008073 B1 | 5/1997 |
| RU | 2244609 C1 | 1/2005 |
| WO | WO-2004/085100 | 10/2004 |
| WO | WO-2008/061937 A2 | 5/2008 |
| WO | WO-2010/006039 | 1/2010 |

OTHER PUBLICATIONS

International Search Report and Written Opinion for PCT Application No. PCT/US2012/036755, mailed Jul. 19, 2012, 7 pages.
Non-Final Office Action on U.S. Appl. No. 13/745,520 Dated Jul. 7, 2015, 16 pages.
Notice of Allowance on U.S. Appl. No. 12/886,418, mail date Mar. 13, 2014, 5 pages.
Office Action on Canadian Application No. 2,730,230, dated Jul. 17, 2015, 3 pages.
Office Action for U.S. Appl. No. 12/886,418, mail date Oct. 7, 2013, 8 pages.
Amendment and Reply for U.S. Appl. No. 12/171,151, mail date Dec. 13, 2011, 8 pages.
Amendment and Reply for U.S. Appl. No. 12/171,151, mail date Jul. 12, 2011, 8 pages.
Brinkmann et al., "Doppel-Unterflur-Radsatzdrehmaschine Mit Reibrollenantrieb IM DB-Werk Muenchen-Pasing Fuer Den Ice," Zeitschrift Fur Eisenbahnwesen Und Verkehrstechnik, Aug. 1, 1994, 7 pages.
Extended European Search Report for European Application No. 09795112.3, dated Oct. 28, 2011, 12 pages.
International Search Report and Written Opinion for International Application No. PCT/US09/49921, mail date Feb. 22, 2010, 7 pages.
Notice of Allowance for U.S. Appl. No. 12/171,151, mail date Dec. 22, 2011, 5 pages.
Office Action for U.S. Appl. No. 12/171,151, mail date Apr. 12, 2011, 6 pages.
Office Action for U.S. Appl. No. 12/171,151, mail date Oct. 13, 2011, 7 pages.
Office Action for U.S. Appl. No. 13/428,952, mailed Jun. 28, 2012, 7 pages.
Preliminary Amendment for U.S. Appl. No. 12/886,418, mail date Jul. 26, 2011, 4 pages.
Promotional materials for a portable wheel lathe of a type understood to be commercially available from Independent Machine Company; printed from website http://www.imc-info.com/ironhorselathes.html; Oct. 13, 2008; 2 pages.

* cited by examiner

SYSTEM FOR AND METHOD OF RE-PROFILING LOCOMOTIVE AND RAIL CAR WHEELS

CROSS-REFERENCE TO RELATED PATENT APPLICATIONS

The present application is related to and claims the benefit of U.S. Provisional Patent Application Ser. No. 61/524,652, filed Aug. 17, 2011, which is incorporated by reference herein in its entirety.

The present application is related to U.S. patent application Ser. No. 12/171,151, filed Jul. 10, 2008, entitled "Wheel Lathe For Railroad Cars and Locomotives," now U.S. Pat. No. 8,186,250, PCT Application Serial No. PCT/US2009/049921, filed Jul. 8, 2009, and U.S. Provisional Patent Application Ser. No. 61/484,562, filed May 10, 2011, all of which are incorporated in their entireties herein by reference.

FIELD

The present disclosure relates generally to the field of maintenance for wheeled vehicles. More specifically, the present disclosure relates to an apparatus for and a method of machining and or maintaining the wheels associated with wheeled vehicles such as a train (e.g., a locomotive, railway car or other railway vehicle).

BACKGROUND

Wheels on railway locomotives and cars are subject to abuse and wear in the course of normal use. This wear changes the contour of the wheel, forming undesirable contours including flats, high flanges and other contours that adversely affect the performance of the wheel. A worn wheel can reduce ride quality, increase the risk of derailments, and contribute to increased wear, fatigue, noise, and damaged switches excessive fuel consumption.

Locomotive and railcar wheel maintenance is important to safety and efficient operation of railways. Locomotive and railcar wheel maintenance typically involves removing the locomotive or railcar from service and re-profiling or "retruing" the wheel with a lathe mechanism. Such known lathe mechanisms may be provided in pits below removable rail sections. Such mechanisms may be computer numerical control (CNC) machines and are generally large, expensive, and not portable. Stationary mechanisms require establishing a permanent maintenance facility or area and removing the locomotive or railcar from service.

Thus, there is a need for a portable re-profiling system for wheels of locomotives or railcars. Furthermore, there is a need for a lathe mechanism that is more efficient and safer than manual lathe mechanisms. Further still, there is a need for an automated re-profiling system that is quick, efficient and less expensive than conventional systems located in permanent maintenance facilities.

There is also a need for a lathe mechanism that is easy to transport. Further, there is a need for a lathe mechanism that does not require a motor to rotate the wheel being reprofiled. There is further a need for a lathe mechanism configured to operate on a wheel assembly.

SUMMARY

An exemplary embodiment relates to a method of re-profiling a wheel. The method includes disengaging a wheel assembly including the wheel from the rail. The method also includes attaching the wheel assembly to a fixture including a lathe machine. The method further includes rotating the wheel by powering a traction motor associated with the wheel assembly and profiling the wheel.

Another exemplary embodiment relates to a system for re-profiling a first wheel in accordance with a first profile. The first wheel is associated with a train. The system includes a lathe cutting tool configured to engage in the first wheel and attached to a compound slide mechanism. The system also includes a plate including supports for supporting a wheel assembly including the first wheel. The plate is attached to the compound slide mechanism.

Another exemplary embodiment relates to a system for re-profiling a first wheel in accordance with a first profile. The first wheel being associated with a train. The system includes means for cutting the first wheel, means for positioning and the means for cutting at last two axis so that the first wheel is cut according to the first profile, and means for supporting a wheel assembly. The wheel assembly includes the first wheel.

BRIEF DESCRIPTION OF THE DRAWINGS

Exemplary embodiments will hereafter be described, wherein like numerals denote like elements and.

DETAILED DESCRIPTION OF THE PREFERRED EMBODIMENTS

Referring in general to the FIGURES and more specifically to FIGS. 1-5, an apparatus 20 for profiling or re-profiling a wheel 12 associated with a train (e.g., the wheel of a railcar, locomotive, or other railway vehicle or apparatus) is shown according to an exemplary embodiment. For the purpose of this specification and the claims, railroad cars include any wheeled systems configured for riding on railroad tracks or rails of any size.

Apparatus 20 includes one or more devices 30 for machining the profile of wheel 12. Devices 30 are coupled to a stationary fixture 40. According to a preferred embodiment, device 30 is a lathe device. Alternatively, apparatus 20 may include devices utilizing milling, grinding or other cutting principles to profile wheel 12. Detailed descriptions of embodiments of exemplary devices 30 are discussed in application U.S. Ser. No. 12,171,151, and PCT Application Serial No. PCT/2009/049921 and U.S. Provisional Application Ser. No. 61/484,562, all incorporated herein by reference in their entireties.

As shown in FIGS. 9-12, according to an exemplary embodiment, wheel 12 is included in a combination axle assembly 10 (e.g., combo axle). Combination axle assembly 10 may be provided on, for example, a locomotive. Combination axle assembly 10 includes wheel 12 and a second wheel 13 are rigidly mounted to an axle 14 (e.g., with an interference fit). Bearings 16 facilitate the rotation of wheels 12 and 13 and axle 14 relative to the locomotive body. Combination axle assembly 10 is driven by a power source such as a traction motor 18 with a housing 21 through a gearbox 19. The specific type of axle assembly 10 shown is exemplary only.

With reference to FIGS. 1-5, apparatus 20 is portable and is able to be easily moved to a railcar or locomotive (e.g., in field profiling) instead of having to move the railcar or locomotive to apparatus 20 (e.g., in-house profiling). Apparatus 20, for example, may be used to service a railcar or locomotive that is broken down at a location away from a station or service area. Apparatus 20 may be transported by a vehicle, such as, a truck, forklift or cart. To facilitate the re-profiling of wheel 12 and wheel 13, combination axle assembly 10 may be removed from the locomotive.

To provide a precise profile for wheel 12 with a relatively short cycle time, lathe device 30 is preferably a computer numerical control (CNC) lathe. The desired profile for wheel 12 and the cutting path needed to provide the profile for wheels 12 and 13 is stored in a computer control coupled to device 30. The computer control can be integrated within or be separate from lathe device 30. The computer control can include a processor or micro controller and memory configured to control actuators such as motors. According to an exemplary embodiment, lathe device 30 may be a lathe as described in U.S. Provisional Patent Application Ser. No. 61/484,562 filed May 10, 2011 which is incorporated in its entirety herein by reference.

A profile for wheel 12 is provided by rotating wheel 12 and moving a cutting tool 32 relative to wheel 12 with a 2-axis slide mechanism 34. A user may operate an interface coupled to a computer control to control device 30.

Slide mechanism 34 moves along a first slide rail 35 along an X-axis parallel to axle 14 and a second slide rail 37 disposed along a Y-axis perpendicular to axle 14. In an alternative embodiment, slide mechanism 34 can also move in a Z—direction perpendicular to the ground or perpendicular to a plane including the X-axis and the Y-axis.

A first power source 36 is provided to move mechanism 34 along first slide 35 and a second power source 38 is provided to move mechanism 34 along slide 37. Power sources 36 and 38 are preferably DC motors. Advantageously, lathe device 30 uses DC drives which are smaller than AC drives in a preferred embodiment. The size of the DC drives allows a lower profile device 30 to be configured. In other exemplary embodiments, lathe device 30 may use AC drives.

Figures 1, 2:
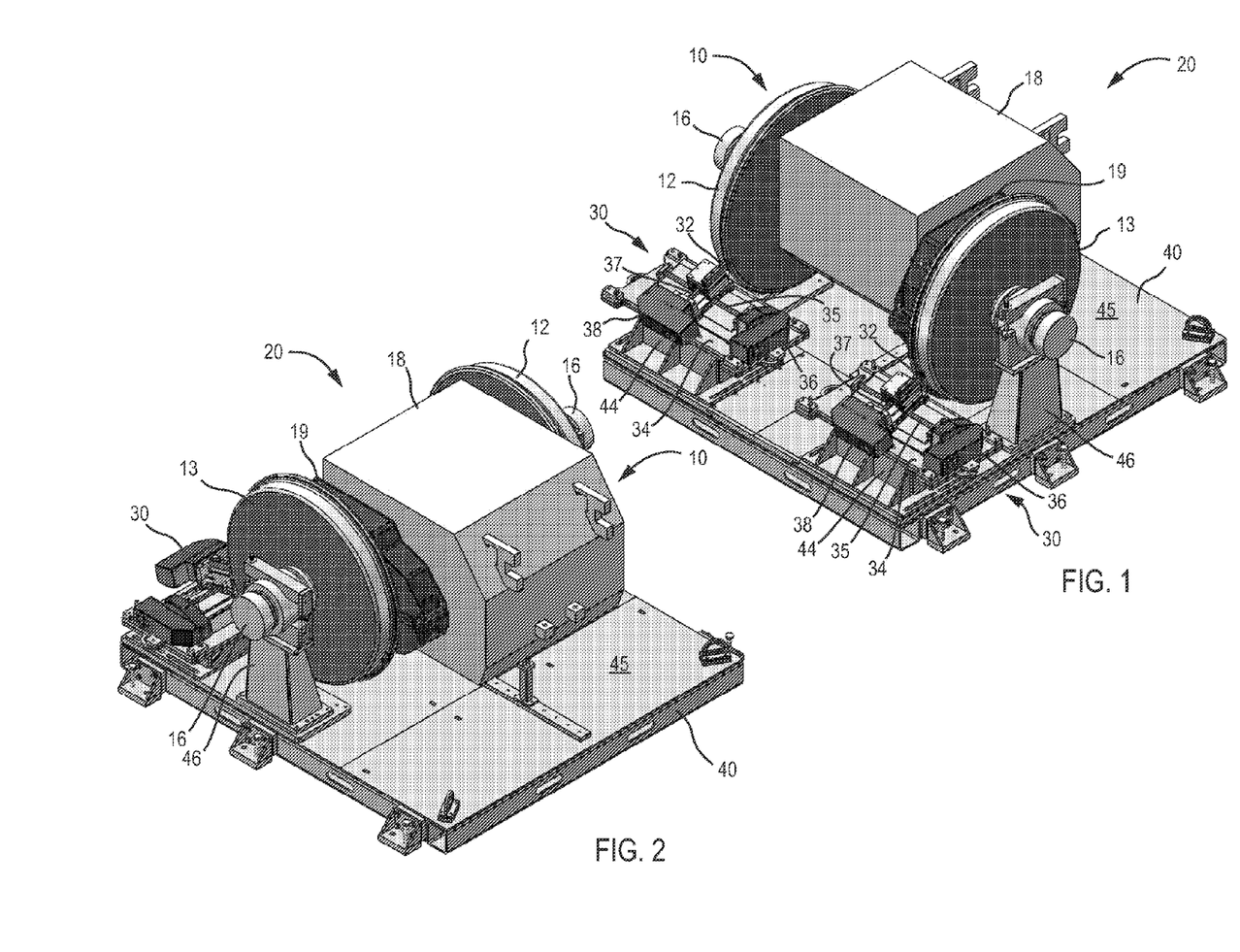
FIG. 1 is a isometric view schematic drawing of an apparatus for re-profiling a wheel associated with a train in accordance with an exemplary embodiment.
FIG. 2 is rear isometric view schematic drawing of the apparatus for re-profiling a wheel of FIG. 1 in accordance with an exemplary embodiment.
Figures 3, 4, 5:
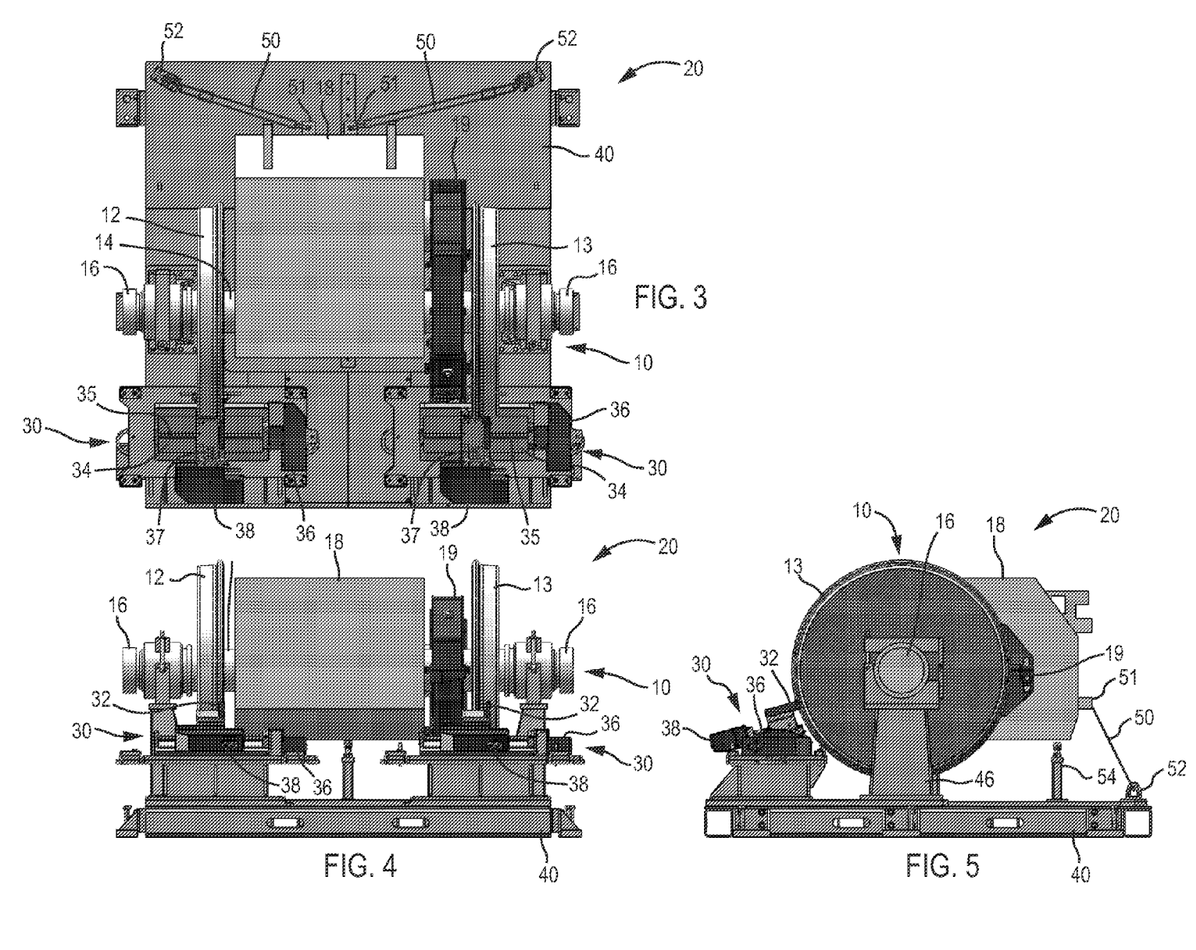
FIG. 3 is a top planar view schematic drawing of the apparatus for re-profiling a wheel of FIG. 1 in accordance with an exemplary embodiment.
FIG. 4 is a front planar view schematic drawing of the apparatus for re-profiling a wheel of FIG. 1 in accordance with an exemplary embodiment.
FIG. 5 is a side planar view schematic drawing of the apparatus for re-profiling a wheel of FIG. 1 in accordance with an exemplary embodiment.
Figure 6:
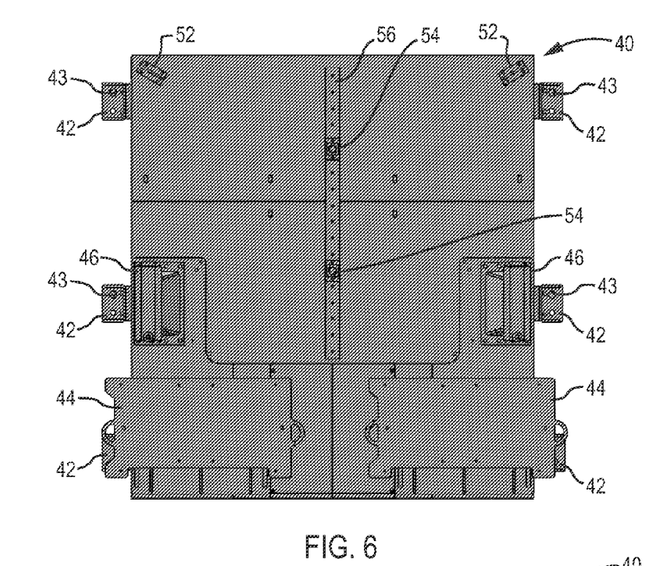
FIG. 6 is a top planar view schematic drawing of a base for the apparatus for re-profiling a wheel of FIG. 1 in accordance with an exemplary embodiment.
Figure 7:
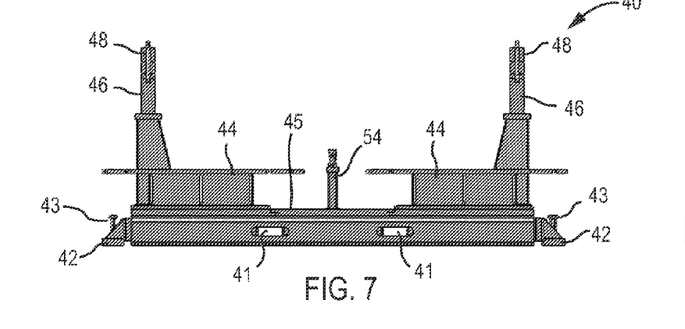
FIG. 7 is a front planar view schematic drawing of the base of FIG. 6 in accordance with an exemplary embodiment.
Figure 8:
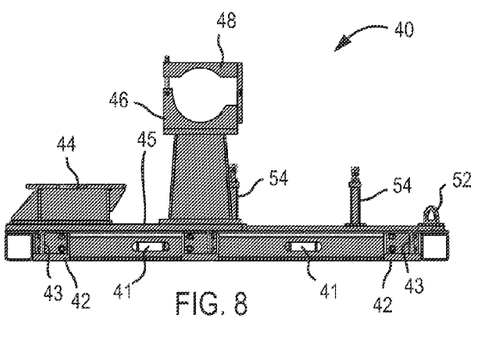
FIG. 8 is a side planar view schematic drawing of the base of FIG. 6 in accordance with an exemplary embodiment.
Figure 9:
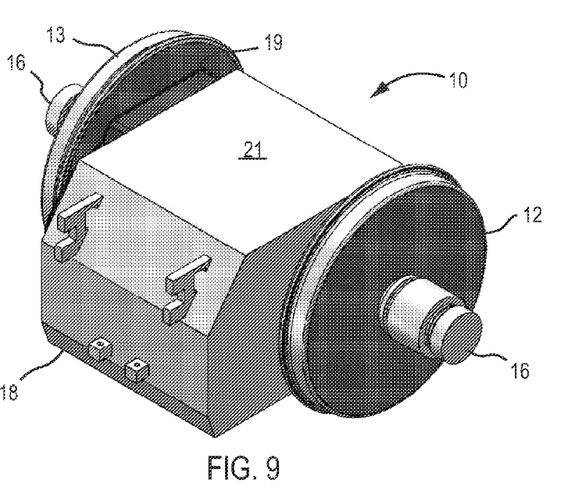
FIG. 9 is a isometric view schematic drawing of an axle assembly for use with the apparatus for re-profiling wheels of FIG. 1 in accordance with an exemplary embodiment.
Figure 10:
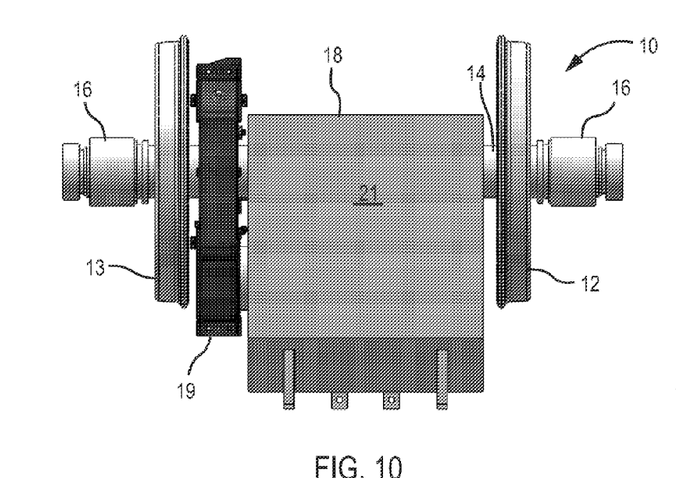
FIG. 10 is a top planer view schematic drawing of the axle assembly of FIG. 9 in accordance with an exemplary embodiment.
Figure 11:
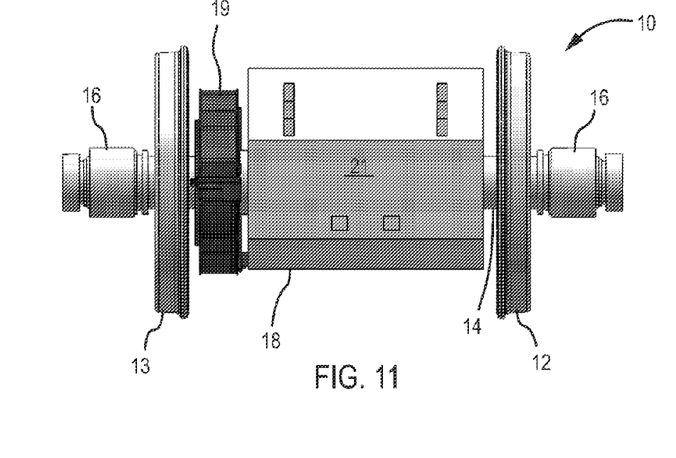
FIG. 11 is a front planer view schematic drawing of the axle assembly of FIG. 9 in accordance with an exemplary embodiment.
Figure 12:
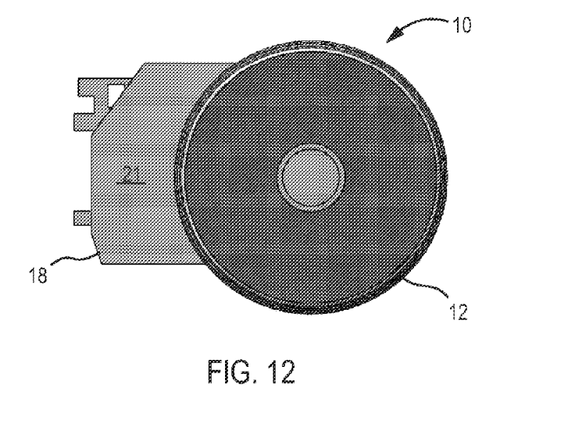
FIG. 12 is a side planer view schematic drawing of the axle assembly of FIG. 9 in accordance with an exemplary embodiment.

Referring now to FIGS. 6-8, one or more lathe devices 30 are mounted to a platform or fixture 40. Fixture 40 includes a plate 45. Fixture 40 is advantageously configured to receive combination axle assembly 10 including housing 21, traction motor 18, and gear box 19. Profiling wheels 12 and 13 while on axle assembly 10 does not require that wheels 12 and 13 be removed from axle 14. The low profile of devices 30 allows axle assembly 10 to be mounted relatively close to plate 45 (e.g., assembly 10 is not raised significantly from plate 45 to accommodate devices 30.

Fixture 40 may include a multitude of openings or slots 41 to allow fixture 40 to be moved with a device such as a forklift. Apparatus 20 is moved to a location at which wheel 12 and/or wheel 13 are to be re-profiled. According to an exemplary embodiment, wheels 12 or 13 may be profiled at a shop near railroad tracks. Fixture 40 can be coupled to the shop floor at a multitude of mounting pads 42 (e.g., leveling pads, anchor pads, etc.) with fasteners such as bolts 43. Shims may be utilized between mounting pads and the floor to level fixture 40.

Apparatus 20 is capable of profiling one wheel on combination axle assembly 10 or both wheels on combination axle assembly 10 simultaneously. One or two riser plates 44 can be coupled to fixture 40 depending on which wheels on combination axle assembly 10 are to be profiled. Riser plates 44 are removable to reduce transportation weight of fixture 40. According to an exemplary embodiment, each riser 44 is coupled to fixture 40 with fasteners such as four bolts. A lathe device 30 is coupled to each riser plate 44 with bolts or other fasteners.

With reference to FIGS. 1-5, a pair of supports or saddles 46 are provided on either side of fixture 40 to receive combination axle assembly 10. Saddles 46 are pedestal-like structures that support combination axle assembly 10 and suspend combination axle assembly 10 high enough above fixture 40 such that wheels 12 and 13 can rotate freely. Combination axle assembly 10 is removed from a locomotive or rail car and placed such that bearings 16 are centered on saddles 46. Combination axle assembly 10 is secured to saddles 46 with brackets 48. Saddles 46 can include brackets 48 for attaching to each end of axle 14.

Traction motor 18 is rotationally secured with chains or straps 50 and support jacks 54. Straps 50 are coupled to brackets 51 on traction motor 18 and tie-down rings or hooks 52 on fixture 40. Support jacks 54 are provided along a support jack position bar 56 that is oriented generally perpendicular to axle 14. Support jacks 54 may be horizontally positioned along position bar 56 to be located under traction motor 18. Fixture 40 may include multiple position bars 56. Support jacks 54 are further adjustable in a vertical direction to contact traction motor 18. The length of chains or straps 50 and the horizontal position and vertical height of support jacks 54 provide a means for supporting a wide variety of traction motors and a wide variety arrangements of traction motors and gearboxes.

Traction motor 18 may be powered using a variety of power sources. In one embodiment, traction motor 18 may be powered by a variable speed AC or DC motor. In another embodiment, traction motor 18 may be powered by another power source such as a power supply for a portable generator or welding power supply.

With traction motor 18 secured in place by straps 50 and support jacks 54, it may be powered to rotate axle 14 and wheels 12 and 13. Lathe devices 30 may then be operated to machine a profile for wheels 12 and 13.

Figure 13:
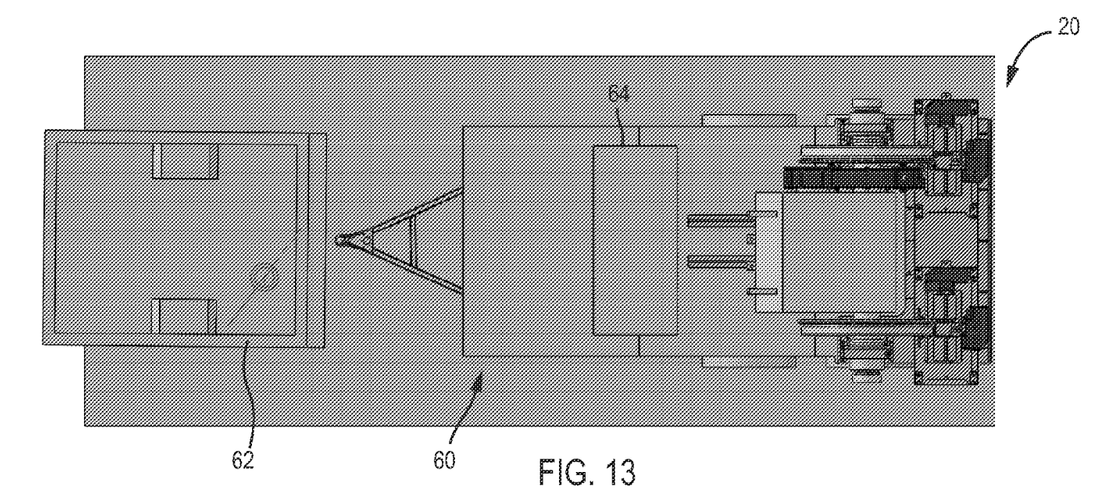
FIG. 13 is a top planer view schematic drawing of an apparatus for re-profiling a wheel associated with a train disposed on a trailer in accordance with another exemplary embodiment.
Figure 14:
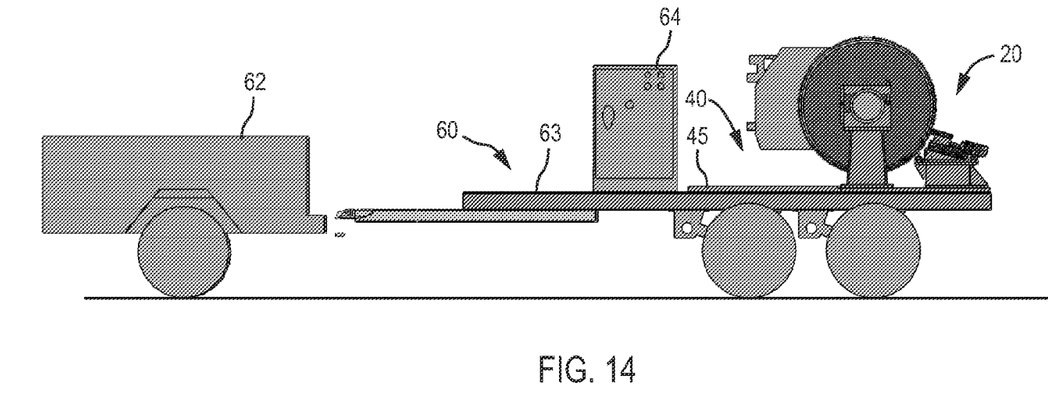
FIG. 14 is a side planer view schematic drawing of the apparatus for re-profiling a wheel of FIG. 13 in accordance with another exemplary embodiment.

Referring now to FIGS. 13 and 14, according to another exemplary embodiment, apparatus 20 may be provided on a trailer 60. Trailer 60 may be towed by a vehicle 62 to the location of a rail car. Plate 45 of fixture 40 can be attached to a floor 63 of trailer 60. A power supply 64 may be coupled to trailer 60 and be transported with apparatus 20. Alternatively, trailer 60 may be configured to ride on railroad tracks.

Figure 15:
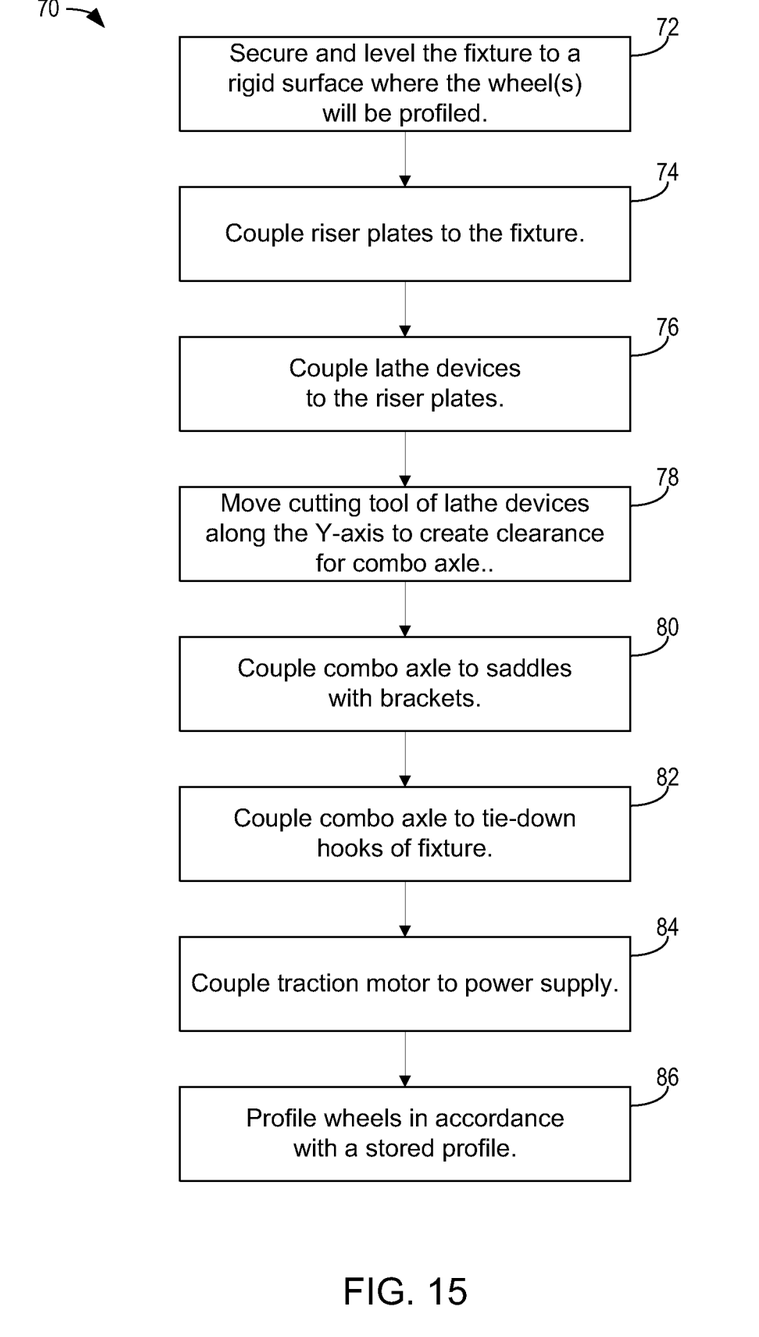
FIG. 15 is a flowchart of a method of re-profiling a wheel in accordance with an exemplary embodiment.

Referring now to FIG. 15, a method 70 for profiling a wheel 12 using apparatus 20 is shown according to an exemplary embodiment. Fixture 40 is first secured and leveled to a rigid surface or structure where the wheel(s) 12 and 13 will be profiled (step 72). For each wheel 12 and 13 that is to be profiled, a riser plate 44 is coupled to the fixture 40 (step 74). A lathe device or cutting device 30 is then coupled to each riser plate (step 76). The lathe device 30 is operated to move the cutting tool 32 along the Y axis to provide clearance for the combination axle assembly 10 (step 78). The combination axle assembly 10 is removed from the locomotive or rail car and placed on saddles 46 of fixture 40 with the bearings 16 centered on saddles 46. Combination axle assembly 10 is coupled to saddle 46 with brackets 48 (step 80). Straps or chains 50 are then coupled to traction motor 18 and tie-down hooks to couple combination axle assembly 10 to fixture 40 (step 82). A power source such as a variable speed AC motor or DC power supply is coupled to traction motor 18 to power traction motor 18 and rotate axle 14 and wheels 12, 13 (step 84). The one or more lathe devices 30 are then utilized to profile the wheel(s) 12, 13 in accordance with a stored profile (step 86). Once the wheels are profiled, the combination axle assembly 10 may be removed from apparatus 20 and replaced on the locomotive or rail car.

While a particular configuration of traction motor 18 and gearbox 19 are shown in the FIGURES, apparatus 20 is able to accommodate a wide variety of traction motors 18, gearboxes 19, and arrangements of traction motors 18 and gearboxes 19.

While combination axle assembly 10 is described as being from a locomotive and including a traction motor 18, according to another exemplary embodiment, combination axle assembly 10 may be from an unpowered rail car and may be powered using a chain and sprocket drive mechanism or friction wheel drive mechanism. According to other exemplary embodiments, combination axle assembly 10 may be power manually using a hand wheel.

For the purpose of this disclosure, the term "coupled" means the joining of two members directly or indirectly to one another. Such joining may be stationary in nature or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

It is important to note that the construction and arrangement of the re-profiling apparatus as shown in the various exemplary embodiments is illustrative only. Although only a few embodiments of the present inventions have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages presented in the present application. The terms re-profiled and profiled are used interchangeably. Accordingly, all such modifications are intended to be included within the scope of the present disclosure. Other substitutions, modifications, changes and omissions may be made in the design, operating conditions and arrangement of the various exemplary embodiments without departing from the scope of the present disclosure.

What is claimed is:

1. A method of re-profiling a wheel, the method comprising:
   disengaging a wheel assembly including the wheel from the rail;
   attaching the wheel assembly to a fixture including a lathe machine, wherein the fixture includes a first support and a second support, the first support and the second support supporting respective ends of an axle associated with the wheel assembly;
   rotating the wheel by powering a traction motor associated with the wheel assembly; and
   profiling the wheel.

2. The method of claim 1, further comprising adjusting a position of a tool associated with the lathe machine using shims.

3. The method of claim 2, wherein the lathe machine is capable of a height of less than 17 inches.

4. The method of claim 2, wherein the lathe machine uses a cutting tool disposed at an angle between 15 and 45 degrees with respect to the rail.

5. The method of claim 1, wherein the lathe machine includes a compound slide system disposed at an angle with respect to the rail for positioning cutting tool in at least two axes.

6. The method of claim 1 wherein two wheels associated with the wheel assembly are profiled by respective cutting tools.

7. A system for re-profiling a first wheel in accordance with a first profile, the first wheel being associated with a train, the system comprising:
   a lathe cutting tool configured to engage the first wheel and attached to a compound slide mechanism; and
   a plate including supports for supporting a wheel assembly including the first wheel, the plate being attached to the compound slide mechanism, wherein the plate includes support jacks for supporting a traction motor associate with the first wheel.

8. The system of claim 7, further comprising: a control for controlling a compound positioning system, wherein the compound positioning system is controlled so that the first wheel is shaped in accordance with the first profile, wherein a second profile is an inverse of the first profile, the second profile being for a second wheel on an opposite side of the train.

9. The system of claim 7, wherein the plate is attached to a trailer.

10. The system of claim 7, wherein the compound positioning system is disposed at an angle less than 45 degrees and more than 15 degrees with respect to the plate.

11. The system of claim 7 further comprising a mechanical alignment device.

12. The system of claim 8, wherein the supports contact respective ends of an axle associated with the first wheel.

13. The system of claim 12, wherein the supports include a clamp mechanism for attaching to the respective ends.

14. The system of claim 7, wherein the support jacks are provided along a support bar on the plate.

15. The system of claim 7, wherein the support jacks are adjustable.

16. A system for re-profiling a first wheel in accordance with a first profile, the first wheel being associated with a train, the system comprising:
    means for cutting the first wheel;
    means for positioning the means for cutting in at least two axes so that the first wheel is cut according to the first profile; and
    means for supporting a wheel assembly including the first wheel, wherein the means for supporting includes a plurality of saddles for engaging an axel of the wheel assembly and a plurality of jack members for engaging a housing of the wheel assembly .

17. The system of claim 16, further comprising:
    means for cutting a second wheel associated with the wheel assembly.

18. The system of claim 7, wherein the first support comprises a saddle for receiving an axel of the first wheel.

19. The system of claim 7, further comprising one or more riser plates between the plate and the cutting tool.

20. The system of claim 7, further comprising one additional lathe cutting tool positioned on the plate to engage a second wheel associated with the wheel assembly.

* * * * *